June 1, 1965  B. VINZELBERG ETAL  3,186,505
APPARATUS FOR MEASURING SMALL FORCES
Filed Sept. 18, 1962
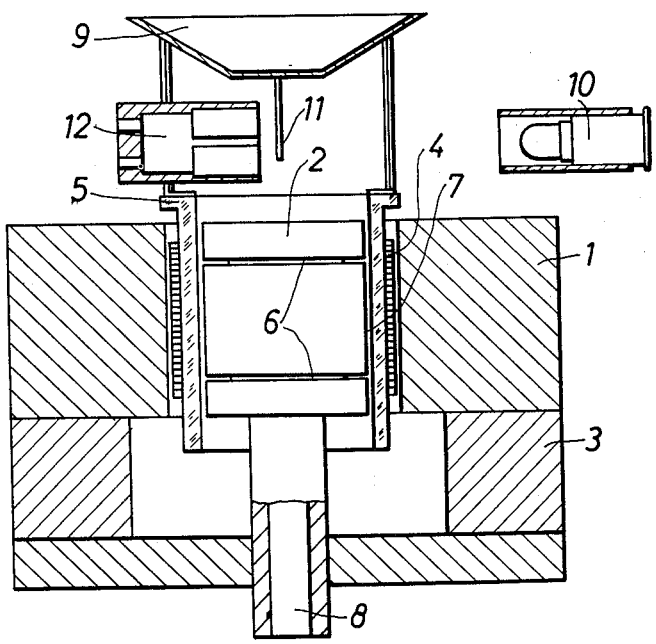
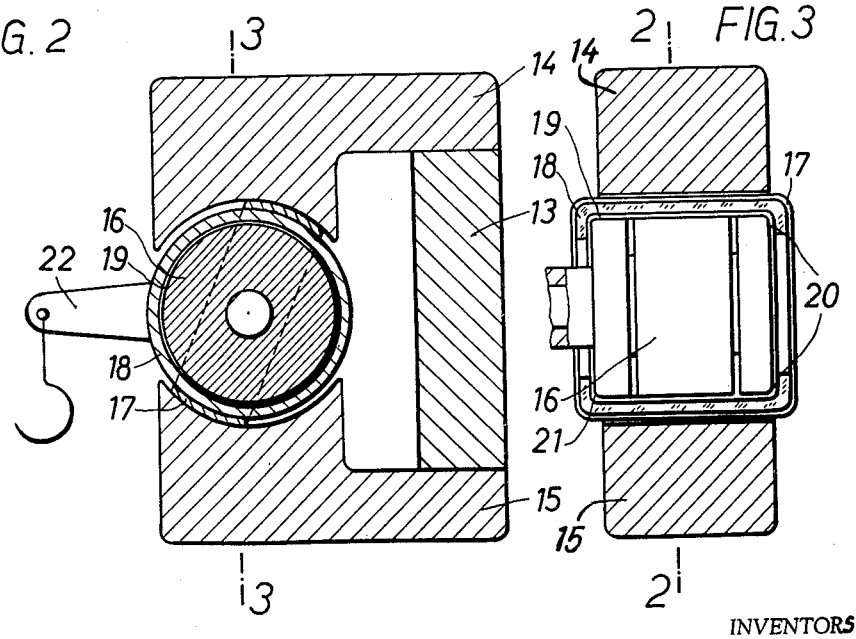
INVENTORS:
BERNHARD VINZELBERG,
WALTER HAUPT.
BY Burgess, Dinklage & Sprung
ATTORNEYS 3,186,505
APPARATUS FOR MEASURING SMALL FORCES
Bernhard Vinzelberg, Leverkusen, and Walter Haupt,
Leverkusen-Bayerwerk, Germany, assignors to Farbenfabriken Bayer Aktiengesellschaft, Leverkusen, Germany, a corporation of Germany
Filed Sept. 18, 1962, Ser. No. 224,299
Claims priority, application Germany, Oct. 2, 1961,
F 35,036
6 Claims. (Cl. 177—210)

The invention relates to an apparatus for measuring small forces, particularly small forces of gravity, in which a suitable opposing force is produced by a coil through which current flows and which is situated in a magnetic field. The routine measurement of small forces of gravity in the range of milliponds and ponds cannot be carried out satisfactorily with the usual measuring devices.

For example, the self-compensating electronic balances using the immersion or a rotary coil principle for measuring small and very small forces are not completely satisfactory as at present constructed and leave much to be desired as regards the need for greater speed of weighing (weighing time less than 200 msec.), accuracy and sensitivity of measurement (limiting sensitivity «1 mp.) and robustness of construction to resist excessive loads.

It has now been found that these requirements may be met in accordance with the invention by using a compressed air bearing of known type as bearing for the coil and measuring system of the measuring instrument. This reduces the friction in the bearing to an extremely low value, particularly out of the position of rest, combined with a small degree of clearance in the bearing and great robustness.

Radial air bearings lubricated with compressed air and constructed as annular gap air bearings are known per se (VDI Report Volume 20, 1957, pages 123/131). As the amount of load which they can tolerate is practically independent of the speed of rotation of the shaft, and as their supporting power is the same everywhere, they are used particularly for high speed shafts, throat bearings, etc. However, radial bearings using compressed air are not the subject of the invention as such.

Measuring instruments (e.g. for measuring torque) are known in which a shaft mounted on compressed air forms part of the actual measurement converter. Such arrangements are not in any way related to the measuring instrument according to the invention.

Constructional embodiments of the subject of the invention are shown diagrammatically in the drawing.

FIGURE 1 shows diagrammatically the construction of an immersion coil weighing device mounted on compressed air. Between the pole shoes 1 and 2, a cylindrical coil with the winding coil 4 on its cylindrical coil former 5 is situated in the magnetic field which is produced by the magnets 3 (permanent magnet, ceramic magnet etc.). The pole shoe 2 and the inner cylindrical surface of the coil former 5 are constructed as air bearings (bearing with double annular gap) with air inlet gaps 6 and a bearing gap 7. The air enters through an axial bore 8 in the pole shoe 2.

If a force acts through the scale pan 9 in the axial direction on the coil 5, the axial displacement which is then produced in the coil is compensated by an electronic device so that the coil is not displaced. The amount of current required for the coil is a measure of the primary force that has to be determined. One embodiment of this is shown in the drawing. The displacement of the bearing of the coil is scanned by the electronic optical arrangement consisting of a light 10, a shutter 11 and a double photoelement 12 (photodiodes, phototransistors, etc.). Movement of the pan in response to a load placed thereon, moves the shutter 11 relative to the light source 10 and photo element 12. This change in relative position is sensed by the photoelement, and the photoelement is operatively connected by means (not shown) to the coil 4 so that current in the coil is varied in correspondence with movement of the pan to counteract such movement and return the pan to its original position with respect to the light source 10. The current in the coil is a measure of the load in the pan and can be correlated with a suitable indicating device to provide an indication of the magnitude of the load.

The current required for returning the coil to its original position is then supplied through an amplifier (not shown).

The change in position of the coil 5 may of course be scanned by other micromeasurement devices, e.g. inductive or capacitive path measuring instruments or Hall-effect generators, which act on the variable amplifier for returning the coil.

FIGURES 2 and 3 show diagrammatically in longitudinal cross section the construction of a rotary coil balance mounted on a compressed air bearing.

The rotary coil 17 situated in the field of the magnet 13 between the pole shoes 14 and 15 and the core 16 is wound onto a coil former 18 whose cylindrical inner surface serves to limit the air bearing 19. The coil former is so constructed on each side that shoulder bearings 20, 21 which prevent axial displacement of the coil former and which are lubricated by compressed air are formed on the end surface of the core 16. The measurement of the coil current required for returning the coil former into its original position is used as a measurement of the force acting on the balance beam 22.

We claim:
1. An apparatus for measuring small forces comprising:
    (a) a magnet having spaced poles for providing a magnetic field in the magnet gap,
    (b) a pole shoe disposed in said gap at a fixed position with respect to the first magnet,
    (c) a coil disposed coaxially with respect to said pole shoe and between the pole shoe and the poles of the magnet,
    (d) load receiving means in fixed connection with the coil for receiving load to be measured,
    (e) said coil and load receiving means being movable axially with respect to the pole shoe,
    (f) current flow through the coil tending to oppose movement of the coil and load receiving means in response to loading of the load receiving means,
    (g) means responsive to movement of the load receiving means and coil and effective to control the current in the coil to counteract such movement, and
    (h) indicating means for indicating current flow in the coil to provide a measure of load,
the improvement which comprises means for passing an air stream between the pole shoe and the coil to provide an air bearing for the movement of the coil and load receiving means relative to the pole shoe.

2. Apparatus according to claim 1, means defining an air passageway through said pole shoe for passage of air through the pole shoe to between the coil and the pole shoe to provide said second bearing.

3. Apparatus according to claim 1, said pole shoe being cylindrical, said coil being mounted on a hollow cylindrical coil form disposed coaxially with respect to the cylindrical pole shoe, means defining an axially extending air passageway for introduction of air into said cylinder, means defining a radially extending passageway communicating with the axially extending passageway and for receiving air therefrom and conveying it to between the cylindrical pole shoe and the coil form to provide said air bearing.

4. Apparatus according to claim 1, the load receiving means being connected with the coil for axially directed movement of the coil in response to loading of the load receiving means.

5. Apparatus according to claim 3, the load receiving means being connected with the coil for rotational movement of the coil in response to loading of the load receiving means.

6. Apparatus according to claim 5, the coil form having at one end thereof inturned end portions overlying and closely spaced from a peripheral portion of an end of the cylindrical pole shoe, providing a shoulder air bearing for the cylindrical pole shoe.

References Cited by the Examiner
UNITED STATES PATENTS

| | | | |
|---|---|---|---|
| 2,141,175 | 12/38 | Dawson | 340—201 |
| 2,591,921 | 4/52 | Cosgriff | 226—199 |
| 3,123,165 | 3/64 | Carson et al. | 177—210 X |

LEO SMILOW, *Primary Examiner.*